(12) United States Patent
Berens

(10) Patent No.: US 11,111,028 B2
(45) Date of Patent: Sep. 7, 2021

(54) VARIABLE AND ADAPTABLE DIVERTERLESS BUMP INLET

(71) Applicant: Airbus Defence and Space GmbH, Taufkirchen (DE)

(72) Inventor: Thomas Berens, Feldkirchen-Westerham (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 534 days.

(21) Appl. No.: 15/992,861

(22) Filed: May 30, 2018

(65) Prior Publication Data

US 2018/0354639 A1 Dec. 13, 2018

(30) Foreign Application Priority Data

Jun. 8, 2017 (EP) .................................... 17000970

(51) Int. Cl.
*B64D 33/02* (2006.01)
*F02C 7/042* (2006.01)
*F02C 7/057* (2006.01)
*B64C 23/00* (2006.01)

(52) U.S. Cl.
CPC ............ *B64D 33/02* (2013.01); *B64C 23/005* (2013.01); *F02C 7/042* (2013.01); *F02C 7/057* (2013.01); *B64D 2033/026* (2013.01); *F05D 2220/80* (2013.01); *F05D 2250/62* (2013.01); *F05D 2260/50* (2013.01)

(58) Field of Classification Search
CPC ............ B64D 33/02; B64D 2033/0226; B64D 2033/026; F02C 7/042; F02C 7/057
See application file for complete search history.

(56) References Cited

U.S. PATENT DOCUMENTS

| 2,763,426 | A | * | 9/1956 | Erwin | ...................... | F02C 7/042 |
| | | | | | | 415/157 |
| 2,780,913 | A | * | 2/1957 | Nicks | ...................... | F02C 7/042 |
| | | | | | | 138/45 |
| 2,950,594 | A | * | 8/1960 | Mitrovich | ............... | F02C 7/042 |
| | | | | | | 244/74 |
| 3,067,578 | A | * | 12/1962 | Goodall | .................. | F02C 7/057 |
| | | | | | | 138/45 |

(Continued)

FOREIGN PATENT DOCUMENTS

| CN | 104384288 A | 3/2015 |
| EP | 0810357 A1 | 12/1997 |
| GB | 1480366 A | 7/1977 |

OTHER PUBLICATIONS

European Search Report; priority document.

*Primary Examiner* — Joseph W Sanderson
(74) *Attorney, Agent, or Firm* — Greer, Burns & Crain, Ltd.

(57) ABSTRACT

A device for a variable and adaptable diverterless bump engine inlet of an aircraft comprises a flexible inlet, a mechanism to change the shape of the flexible inlet, and a processing unit to control the mechanism. The flexible inlet of the device includes a plurality of edges attached partly to a fuselage skin and partly to an engine inlet duct. With this device, the shape of the flexible inlet can be controlled according to the flight conditions, and hence the engine air intake will perform more efficient at all speeds while fulfilling requirements for less radar visibility.

9 Claims, 4 Drawing Sheets

(56) References Cited

U.S. PATENT DOCUMENTS

| | | | | |
|---|---|---|---|---|
| 3,265,331 A * | 8/1966 | Miles | F02C 7/042 | 244/53 B |
| 3,439,692 A * | 4/1969 | Pike | B64C 30/00 | 137/15.2 |
| 3,443,598 A * | 5/1969 | Pierce | F02K 1/10 | 138/45 |
| 3,456,664 A * | 7/1969 | Foote | F02C 7/042 | 137/15.2 |
| 3,611,724 A * | 10/1971 | Kutney | F02C 7/045 | 60/226.1 |
| 3,618,699 A * | 11/1971 | Evans | F02C 7/045 | 181/214 |
| 4,579,300 A * | 4/1986 | Carr | B64C 39/062 | 244/12.1 |
| 4,919,364 A * | 4/1990 | John | F02K 7/16 | 244/55 |
| 4,979,699 A * | 12/1990 | Tindell | B64D 33/02 | 244/53 B |
| 4,991,795 A | 2/1991 | Koncsek | | |
| 5,033,693 A * | 7/1991 | Livingston | B64D 33/02 | 244/53 B |
| 5,078,341 A * | 1/1992 | Bichler | B64D 33/02 | 244/53 B |
| 5,116,251 A * | 5/1992 | Bichler | F02C 7/042 | 244/53 B |
| 5,226,455 A * | 7/1993 | duPont | B64D 33/02 | 137/15.1 |
| 5,301,901 A * | 4/1994 | Kutschenreuter, Jr. | B64D 33/02 | 137/15.1 |
| 5,749,542 A | 5/1998 | Hamstra et al. | | |
| 6,079,667 A * | 6/2000 | Gruensfelder | F02C 7/32 | 244/53 B |
| 6,089,505 A * | 7/2000 | Gruensfelder | F02C 7/042 | 244/53 B |
| 6,901,737 B2 * | 6/2005 | Schnoor | B64D 33/02 | 244/53 B |
| 7,429,018 B1 * | 9/2008 | Kechely | F02C 7/042 | 137/15.1 |
| 7,739,865 B2 * | 6/2010 | Prasad | B64D 33/02 | 60/226.1 |
| 8,286,654 B2 * | 10/2012 | Prasad | F02C 7/042 | 137/15.1 |
| 8,371,324 B1 * | 2/2013 | Fink | F02C 7/042 | 137/15.1 |
| 8,425,283 B2 * | 4/2013 | Porte | B64D 33/08 | 454/73 |
| 9,631,555 B2 * | 4/2017 | Howarth | F02C 7/042 | |
| 9,758,253 B2 * | 9/2017 | Troia | B64C 23/06 | |
| 9,908,633 B2 * | 3/2018 | Huynh | F02C 7/042 | |
| 9,951,690 B2 * | 4/2018 | Labrecque | F02C 7/045 | |
| 10,427,795 B2 * | 10/2019 | Telgkamp | B64D 13/00 | |
| 10,837,362 B2 * | 11/2020 | Dindar | F02C 7/057 | |
| 2005/0274103 A1 * | 12/2005 | Prasad | B64D 33/02 | 60/226.1 |
| 2008/0135689 A1 * | 6/2008 | Parikh | B64D 13/00 | 244/53 B |
| 2008/0223978 A1 * | 9/2008 | Kechely | F02C 7/042 | 244/10 |
| 2009/0253361 A1 * | 10/2009 | Porte | B64D 33/08 | 454/73 |
| 2016/0053685 A1 * | 2/2016 | Labrecque | F02C 7/045 | 415/119 |
| 2016/0288917 A1 * | 10/2016 | Huynh | B64C 1/0009 | |
| 2020/0040843 A1 * | 2/2020 | Pal | F02K 1/17 | |
| 2020/0309030 A1 * | 10/2020 | Tan | B64D 33/02 | |

* cited by examiner

VARIABLE AND ADAPTABLE DIVERTERLESS BUMP INLET

CROSS-REFERENCES TO RELATED APPLICATIONS

This application claims the benefit of the European patent application No. 17000970.8 filed on Jun. 8, 2017, the entire disclosures of which are incorporated herein by way of reference.

TECHNICAL FIELD

The invention generally relates to a variable and adaptable diverterless bump inlet of an aircraft.

BACKGROUND OF THE INVENTION

Conventional engine air inlet design for military aircraft regularly comprises a boundary layer diverter in order to keep the forebody boundary layer of the aircraft from being ingested into the inlet. If ingested, this low energetic boundary layer air causes flow disturbances in the inlet duct which are detrimental for the performance of the engine. The diverter is a gap between the engine air inlet and the fuselage of the aircraft for skimming off the low-pressure boundary layer air from the forward fuselage in order to prevent this air from entering the inlet and causing disturbances in the inlet adversely impacting engine operation. One of the disadvantages of having a boundary layer diverter is that it increases the radar cross section of the aircraft, leading to earlier detection of the aircraft by enemy radar stations.

The above-mentioned disadvantages were addressed by some advanced fighter aircraft designs being equipped with diverterless supersonic inlets, also termed as diverterless bump inlets, featuring an inlet design without a conventional boundary layer diverter. The bump in the diverterless bump inlet design diverts most of the forebody boundary layer away from the inlet entry due to span-wise static pressure gradients on the bump surface, thus avoiding ingestion of the boundary layer. Also the bump isentropically compresses the air during supersonic flight to maximize inlet performance, thus improving the engine performance.

The geometry of the diverterless bump inlet is highly customized for supersonic flight and the specific design Mach number. This customized geometry is generally unfavorable for off-design flight conditions, which in turn requires extensive inlet design efforts. Trade-offs and compromises in the overall inlet and possible aircraft designs have to be made to adapt the customized geometry design of the diverterless bump inlet to accommodate the aircraft's mission profiles.

Hence, there may be a need to provide a device or method for an engine inlet to perform more efficiently at most of the mission segments and flight conditions of the aircraft.

SUMMARY OF THE INVENTION

It should be noted that the aspects of the invention described in the following apply both to the aircraft engine inlet and to a method for varying the engine inlet of the aircraft.

According to the present invention, a device for an aircraft engine inlet is presented. The device comprises a flexible inlet, at least one mechanism, and a processing unit. The flexible inlet is formed of a deformable material. The flexible inlet comprises an outer surface, an inner surface, and plurality of edges. The plurality of edges are partly attached to the fuselage skin of the aircraft. The plurality of edges are partly attached to the engine air intake duct of the aircraft. The engine inlet further comprises at least one mechanism, wherein the mechanism is configured to change at least a shape of the flexible inlet. The engine inlet further comprises a processing unit, wherein the processing unit is configured to control the mechanism.

The term "aircraft engine inlet" may be understood as the complete engine inlet section of an aircraft comprising at least an inlet duct arranged adjacent to the fuselage surface providing an undisturbed air flow to the engine.

The term "flexible inlet" may be understood as a section of the aircraft engine inlet made of flexible material allowing the part to change its shape as and when required.

The term "shape of the flexible inlet" may be understood as the shape of the flexible inlet when viewed from one or many axes almost parallel to the surface of the flexible inlet.

In other words, by changing the shape of the flexible engine inlet, it is possible to vary the engine inlet to perform more efficiently at most of the mission segments and flight conditions of the aircraft.

According to a further embodiment, the deformable material may have a flexibility and a strength. The flexibility and the strength may be determined based on the shape of the flexible inlet. It is is it to be understood that the flexible inlet may take different shapes at different flight conditions, and hence the deformable material should have a flexibility for the flexible inlet to change from one shape to another. Further to withstand different forces exerted on the flexible inlet to attain different shapes, the strength of the deformable material is determined accordingly. Further one can include the fatigue cycle of the flexible inlet to determine the flexibility and the strength of the deformable material.

According to a further embodiment, the deformable material of the flexible inlet may comprise at least two sections. The flexibility and the strength of the different sections may comprise the same or different flexibility and strength. In practice the force exerted on the flexible inlet might not be even throughout. The force applied might be always at one section of the flexible inlet and that particular section may need to be of different flexibility and strength from the rest of the section of the flexible inlet.

According to a further embodiment, the plurality of edges of the flexible inlet may define the planform shape of the flexible inlet. The flexible inlet preferably be attached to the fuselage skin and the engine air intake duct such that the outer surface of the flexible inlet is continuous with at least a surface of the fuselage skin and at least a surface of the engine air intake duct.

The term "planform shape of the flexible inlet" may be understood as the shape of the flexible inlet when viewed from an axis almost perpendicular to the surface of the flexible inlet.

It is possible that due to the material used and the strength requirement of the flexible inlet, the fuselage skin, and the engine air intake duct may not be the same. Hence the thickness of the flexible inlet can be different from the thickness of the fuselage skin and the thickness of the engine air intake duct. The thickness of the flexible inlet can be defined as the distance between the outer surface and the inner surface of the flexible inlet. It is to be understood that in such situations, when the flexible inlet may be attached to the fuselage skin and the engine air intake duct, the continuity of the outer surface is preferably maintained to ensure smooth air flow. In specific the boundary layer is preferably not distorted. At the least, the disturbance caused is preferably kept at a minimum, preferably near the region where the flexible inlet is attached to the fuselage skin and engine air intake duct.

According to a further embodiment the mechanism comprises at least one head. The head may be in contact with the inner surface of the flexible inlet. The head is usually curved with a preferably smooth surface to preferably have a smooth contact with the flexible inlet and also to ensure that the damage due to friction between the head and the inner surface of the flexible inlet may be kept to a minimum. Further, the shape of the head can be decided based on different shapes of the flexible inlet to be achieved during various flight conditions of the aircraft.

The mechanism may further comprise at least one arm, wherein the arm comprises at least a first end and a second end. The first end of the arm may be connected pivotally to the head of the mechanism.

The mechanism may further comprise at least one positioning system, wherein the positioning system may further include at least one control joint and a base. The base of the positioning system can be fixed to at least a structure of the aircraft. The control joint of the positioning system may be connected to the second end of the arm. The control joint may further be configured to receive a signal from the processing unit, wherein the signal can be a required position of the arm.

According to a further embodiment, the control joint of the positioning system is configured to control the arm of the mechanism by moving the arm along at least one of a longitudinal, lateral, and a vertical axis of the arm.

The arm can be moved along its vertical axis by the control joint by designing the arm to be for example telescopic in nature. The drive mechanism of the telescopic arrangement of the arm can be a conventional piston type actuated for example hydraulically or pneumatically. The drive mechanism can also be of a screw type, where by rotation of either the outer or the inner cylinder the length changes accordingly. It is to be noted that the drive mechanism to move the arm along its vertical axis can be one of or a combination of the above described mechanisms or can be of any other method known to change the length of the structure.

In another embodiment the control joint of the positioning system is further configured to control the arm of the mechanism by rotating the arm along at least one of a longitudinal, lateral, and vertical axis of the arm. The definition of the axis can be understood from the earlier description.

Further it has to be understood that in practice the control joint may not need to be controlled by moving and rotating the arm along or about all lateral, longitudinal and vertical axes. It might for example be sufficient for the control joint to control the arm in just one or a few of the six degrees of freedom of the arm to achieve the required shape of the flexible inlet.

The mechanism in another embodiment can be a simple pressure based mechanism. In this embodiment, the mechanism comprises at least a bladder and a control joint. The control joint may be configured to receive a signal from the processing unit, wherein the signal can for example be a required pressure of the bladder. The control joint may also be configured to control the pressure of the bladder such that the pressure will be similar to that of the required pressure of the bladder.

According to a further embodiment the processing unit may be configured to receive a plurality of flight parameters from the aircraft. The flight parameters may include, but not limited to, parameters like speed, altitude, ambient air temperature, ambient air pressure, ambient air density of the aircraft. Alternatively, it can be understood that the processing unit receives all necessary parameters from the aircraft to calculate for example the dynamic pressure and Reynolds number corresponding to the flight condition of the aircraft.

The processing unit may further be configured to receive an information from a database, wherein the information available in the database may comprise at least a flight condition, and a position of the arm of the mechanism or a pressure of the bladder. The flight condition information in the database may at least be a dynamic pressure and a Reynolds number. The position of the arm of the mechanism information in the database may include one or many of the positions of the arm along and about its longitudinal, lateral, and vertical axes.

The processing unit may further be configured to compare the information from the database against the received flight parameters and identify a required position of the arm of the mechanism or a required pressure of the bladder. The process of identifying may involve comparing the received flight parameter against the flight condition, and considering the corresponding position of the arm or the pressure of the bladder as the required position of the arm or required pressure of the bladder, respectively. For example, in case the flight condition does not appear in the list of flight conditions of the database, then the closest in the list of flight conditions may be considered to identify the required position of the arm or the required pressure of the bladder. Alternatively, an upper and lower value of the received flight parameter in the list of flight conditions can be considered and the corresponding position of the arm or the pressure of the bladder can be interpolated. In case either the upper or lower value of the received flight parameter may not be available in the list of flight condition, then the data can for example be extrapolated.

The processing unit may further be configured to control the control joint of the mechanism.

According to a further embodiment the position of the arm or the pressure of the bladder in the database may be determined based for example on the different shape of the flexible inlet to be achieved for different flight conditions. The position of the arm or the pressure of the bladder can, for example, be determined based on the shape of the flexible inlet during the design phase of the aircraft.

The shape of the flexible inlet can be different for different flight conditions, and hence the arm or the bladder to be placed in different position to achieve the shape for different flight conditions. During the design of the aircraft, it can be decided on what kind of mechanism to be used and where in the aircraft these mechanisms might be placed.

According to another embodiment, the shape of the flexible inlet can be determined based on one of a fluid dynamic simulation result during the design of the aircraft.

The fluid dynamic simulation used to determine the shape of the flexible inlet during the design of the aircraft can be one or combination of numerical or computational or experimental fluid dynamic simulations in another embodiment.

The numerical fluid dynamic simulation could be one of a classical fluid dynamic calculation. The computational fluid dynamic simulation could be a fluid dynamic simulation performed with commercially available fluid dynamic simulation software. The experimental fluid dynamic simulation could be a wind tunnel analysis commonly performed to understand the aerodynamic characteristic of an object.

Alternatively, experimental fluid dynamic simulation can be performed by installing the proposed device on an actual aircraft and various shapes can be studied to decide on an optimal shape of the flexible inlet to be used in the aircraft at different flight conditions.

In another embodiment, the fluid dynamic simulations can be performed for all flight conditions defined in a design mission profile and a design flight envelope of the aircraft. In order to capture intermediate flight conditions, the fluid dynamic simulations can be performed for flight conditions other than the flight conditions in the design mission profile and design flight envelope.

During the fluid dynamic simulations, various shapes of the flexible inlet can be simulated for a particular flight condition to identify the shape of the flexible inlet that gives maximum benefit. Such identified shape of the flexible inlet can be used to create the database. Based on the design of the mechanism, for example an appropriate position of the arm is determined to be a position of the arm in the database for the flight condition.

As a result, an adaptable and varying diverterless bump inlet can be provided, which in particular provides flexibility to adjust the flexible inlet surface according to the specific requirements, thus maximizing the inlet performance and hence the thrust efficiency of the engine. The device further reduces the time and cost to develop the aircraft due to its simplicity and flexibility nature.

According to the present invention also a method for an adaptable and varying diverterless bump inlet is presented.

The method comprises the step of receiving the flight parameters of an aircraft. The method further comprises comparing the received flight parameters against a database for at least a position of an arm of a mechanism. The database comprises plurality of flight conditions and corresponding at least a position of the arm of the mechanism. The flight conditions in the database include at least a flight conditions defined in a design mission profile and a design flight envelope of the aircraft. The method further comprises a step of controlling the position of the arm of the mechanism to a position similar to the position of the arm of the mechanism in the database corresponding to the received flight parameters of the aircraft.

However, the skilled person will understand that these steps can be carried out in any other suitable order. Alternatively, one or more of the steps may be carried out concurrently.

These and other aspects of the present invention will become apparent from and be elucidated with reference to the embodiments described hereinafter.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the drawings, the left-most digit(s) of a reference number can identify the drawing in which the reference number first appears. The same numbers can be used throughout the drawings to reference like features and components. In the following description, various embodiments of the invention are described with reference to the following drawings, in which.

DETAILED DESCRIPTION OF THE PREFERRED EMBODIMENTS

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1:
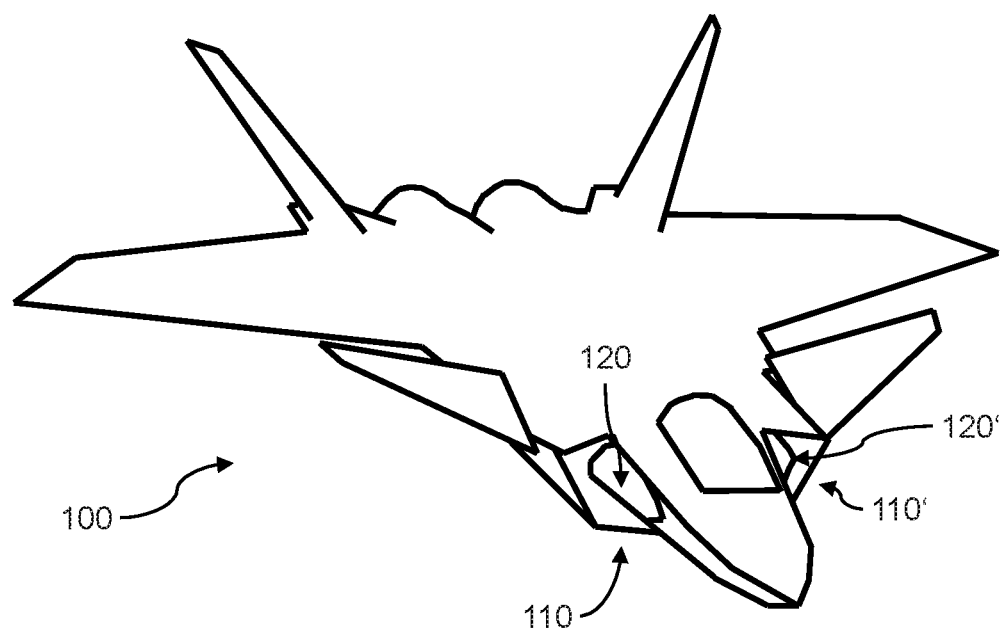
FIG. 1 shows schematically an aircraft with engine inlet.

FIG. 1 shows schematically an exemplary aircraft 100 with an engine inlet 110 and 110'. FIG. 1 also schematically shows a flexible inlet 120 and 120' being part of the engine inlet 110 and 110' respectively. The engine inlet 110 placed along the surface of the fuselage to provide air for the engine of the aircraft 100. The engine inlet 110 is a diverterless inlet. The flexible inlet 120 schematically shown in FIG. 1 is a section of the engine inlet 110 formed of flexible material capable of changing its shape through one or many of the embodiments described in this application. The engine inlet 110' and flexible inlet 120' are similar to the engine inlet 110 and flexible inlet 120 described earlier, but placed on other side of the aircraft 100.

Figure 2:
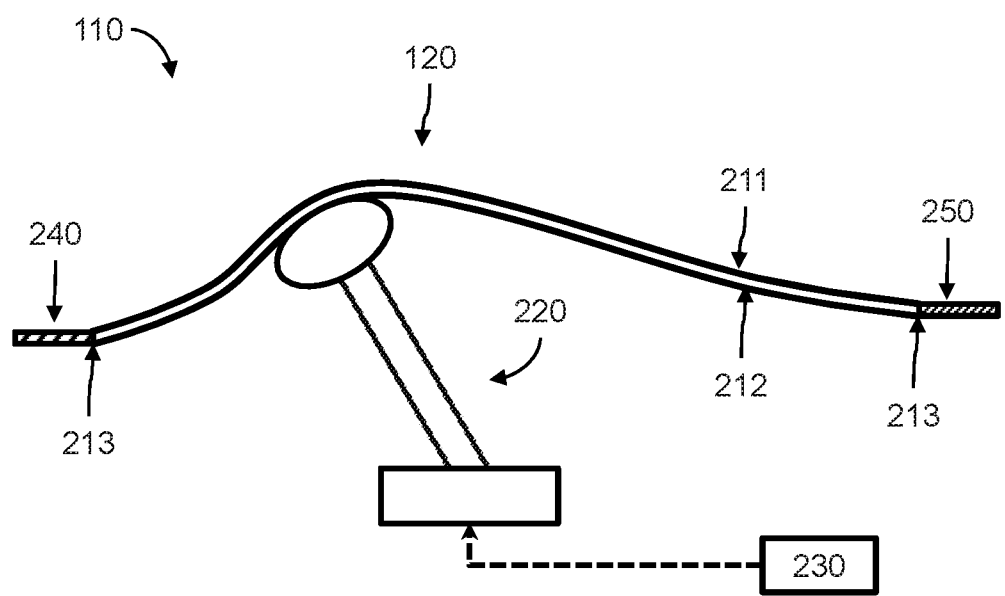
FIG. 2 shows schematically an embodiment of an engine inlet.

FIG. 2 shows schematically an embodiment of an engine inlet 110. The engine inlet 110 comprises a flexible inlet 120 formed of a deformable material. The flexible inlet 120 further comprises an outer surface 211, an inner surface 212, and plurality of edges 213. The outer surface 211 can be understood in the present disclosure as the surface of the flexible inlet 120 exposed to the free stream of air during flight. The inner surface 212 can be understood as the other surface of the flexible inlet 120. The plurality of edges 213 defines the planform shape of the flexible inlet and is partly attached to a fuselage skin 240 and partly attached to an engine air intake duct 250. The flexible inlet 120 is attached to the fuselage skin 240 and engine air intake duct 250 such that the outer surface 211 is continuous with at least a surface of the fuselage skin 240 of the aircraft 100 and at least a surface of the engine air intake duct 250. The engine inlet 110 of FIG. 1, the engine inlet 110 comprises a mechanism 220 to change the shape of the flexible inlet 120. The engine inlet 110 comprises a processing unit 230 to control the mechanism 220. The processing unit 230 is connected to the mechanism 220 to control, wherein the connection means can be wired or wireless (not shown) to transfer the control signal from the processing unit 230 to the mechanism 220.

Figure 3:
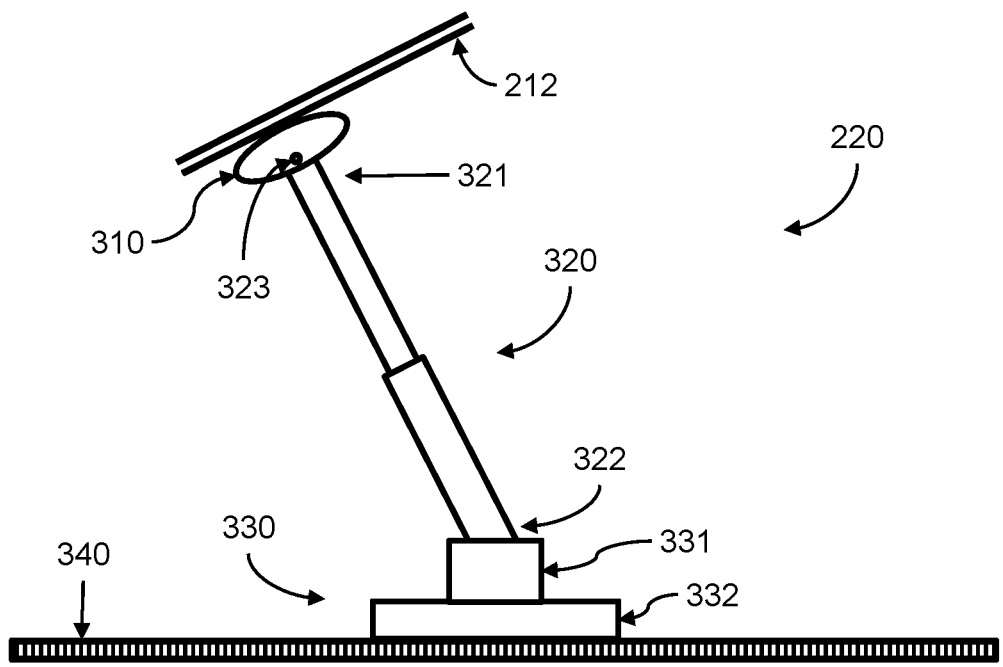
FIG. 3 shows schematically the mechanism of first embodiment.

FIG. 3 shows schematically the exemplary mechanism 220. The mechanism 220 comprises a head 310, an arm 320, and a positioning system 330. The head 310 is in contact with an inner surface 212 of a flexible inlet 120. In order to have smooth contact with the flexible inlet 120 and not to damage the inner surface 212 of the flexible inlet 120 while changing the shape of the flexible inlet 120, the head 310 is usually curved with a smooth surface. Further the shape of the head 310 can also be decided based on the required shapes of the flexible inlet 120 to be achieved during various flight conditions of the aircraft 100. The arm 320 of the mechanism 220 comprises a first end 321 and a second end 322. The first end 321 is connected to the head 310 by a connection 323. The connection 323 of the first end 321 to the head 310 is on the side of head 310 substantially opposite to the side of the head 310 in contact with the inner surface 212 of the flexible inlet 120. Further the connection 323 may not be rigid, but it can be a pivot to enable the head 310 to move freely about the connection 323 but still being connected to the arm 320. The second end 322 of the arm 320 is connected to the positioning system 330 as described in further embodiment. The positioning system 330 of the mechanism 220 includes a control joint 331 and a base 332. The base 332 of the positioning system 330 serves to fix the positioning system 330 and hence the mechanism 220 to one or many of a structure 340 of an aircraft. The control joint 331 of the positioning system 330 is connected to the second end 322 of the arm 320. The control joint 331 is further configured to receive commands from the processing unit 230 and moves the arm 320 accordingly. The control joint 331 of the positioning system 330 is configured to control the arm 320 of the mechanism 220 for example by moving the arm 320 along at least one of a longitudinal, lateral, and vertical axis of the arm 320. The vertical axis of the arm 320 can be the axis along the length of the arm 320. The longitudinal and lateral axes of the arm 320 in such case will be the other two perpendicular axes on the plane perpendicular to the vertical axis of the arm 320. The arm 320 can be moved along its vertical axis by the control joint 331 by designing the arm 320 to be telescopic in nature. The control joint 331 of the positioning system 330 is further configured to control the arm 320 of the mechanism 220 for example by rotating the arm 320 along at least one of a longitudinal, lateral, and vertical axis of the arm 320. The definition of the axis can be understood from the earlier description. Further it has to be understood that in practice the control joint 331 may need not to be controlled by moving and rotating the arm 320 along or about all lateral, longitudinal and vertical axes. It might be sufficient for the control joint 331 to control the arm 320 in just one or few of the six degrees of freedom of the arm 320 to achieve the required shape of the flexible inlet 120.

Figure 4:
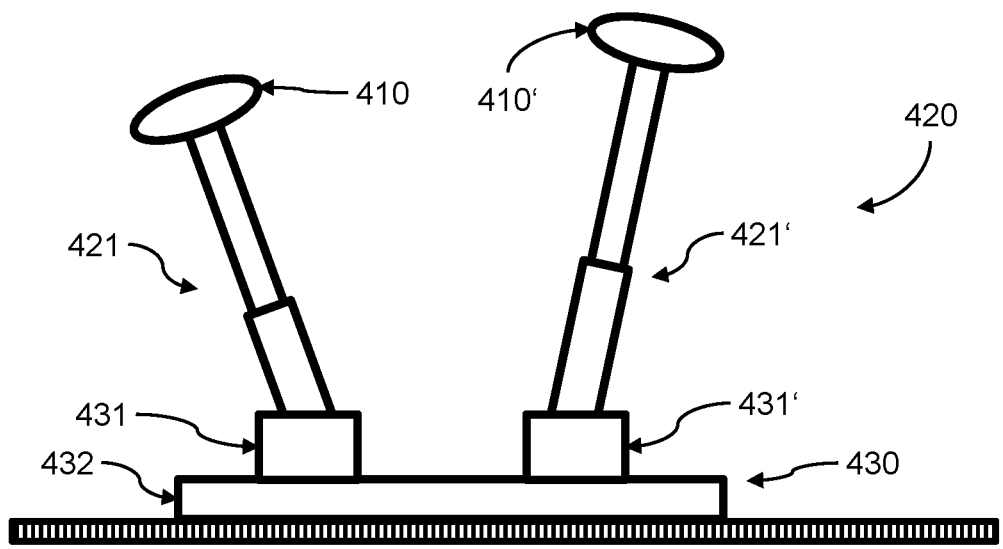
FIG. 4 shows schematically the mechanism with two arms, each controlled by two different control joints.

FIG. 4 shows schematically a further embodiment of an exemplary mechanism 420. In this embodiment the mechanism 420 is similar to the mechanism 220 shown in FIG. 2. In the embodiment shown in FIG. 4 the positioning system 430 of the mechanism 420 includes two control joints 431 and 431' on a common base 432. Each control joint 431 and 431' is connected to two separate arms 421 and 421'. Further, each arm 421 and 421' is connected to two different heads 410 and 410'. The purpose, design, and mechanism, where applicable, of the base 432, control joints 431 and 431', arms 421 and 421', and heads 410 and 410' can be understood to be similar to the base 332, control joint 331, arm 320, and head 310 as described earlier in connection with FIG. 3. Further it has to be understood that though the illustration shows only two arms 421 and 421' and associated components, but in practice there can be more than 2 arms and associated components.

Figure 5:
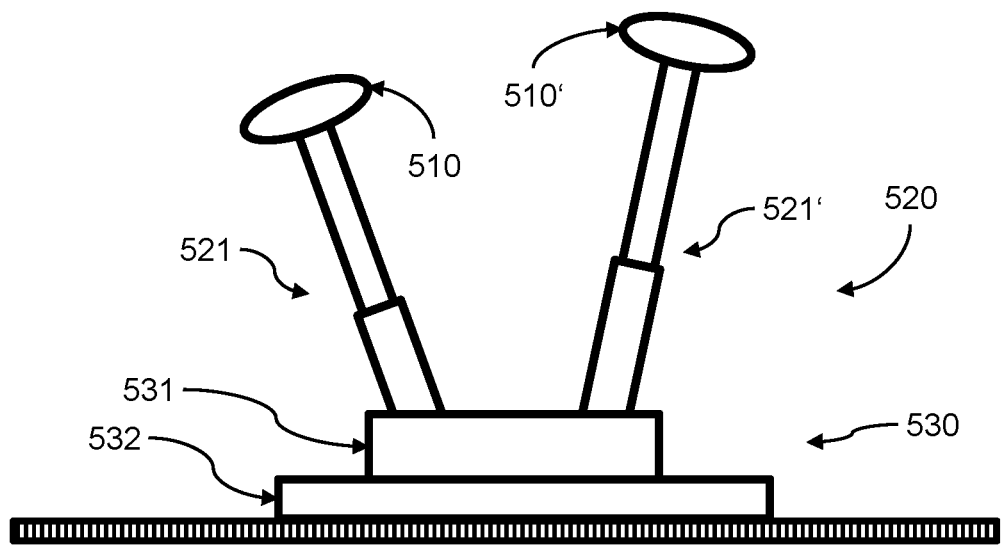
FIG. 5 shows schematically the mechanism with two arms, each controlled by single control joint.

FIG. 5 shows schematically a further embodiment of an exemplary mechanism 520. In this embodiment, the mechanism 520 is similar to the mechanism 420 shown in FIG. 4. In the embodiment shown in FIG. 5 the positioning system 530 includes only one control joint 531 on a base 532, controlling two arms 521 and 521' of the mechanism 520. The two arms 521 and 521' are separately connected to two heads 510 and 510' to change the shape of the flexible inlet 120. Further it has to be understood that though the illustrations show only two arms 521 and 521' being controlled by the control joint 531, in practice, there can be more than two arms being controlled by the control joint 531.

Figure 6:
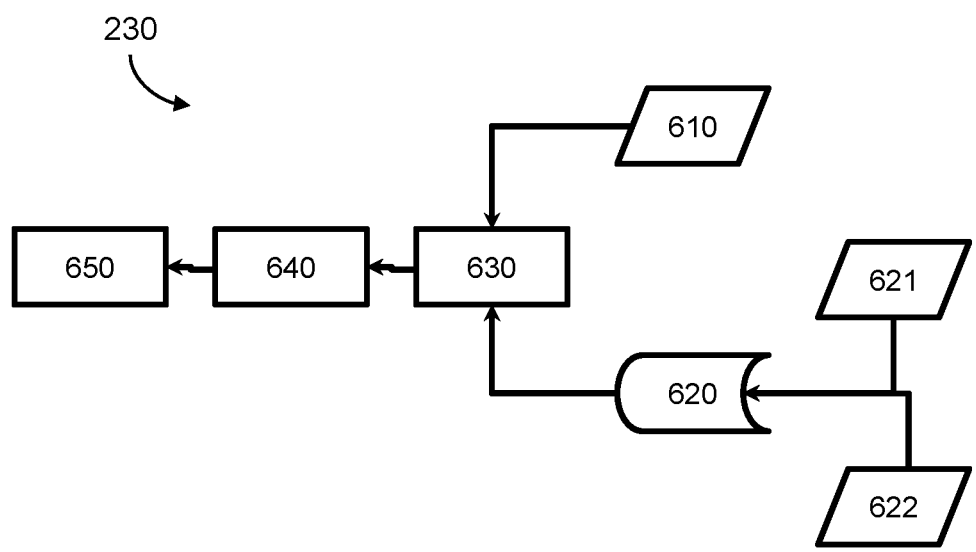
FIG. 6 shows schematically a flowchart of operation of processing unit.

FIG. 6 shows schematically a flowchart of the operation of the processing unit 230. The processing unit 230 is configured to receive as input parameters a plurality of flight parameters 610 of an aircraft. The flight parameters 610 include, but are not limited to parameters like speed, altitude, ambient temperature, ambient pressure, ambient density of the aircraft 100. Alternatively, it can be understood that the processing unit 230 receives all necessary parameters from the aircraft 100 to calculate the dynamic pressure and Reynolds number corresponding to the flight condition of the aircraft 100. The processing unit 230 is further configured to receive further as input parameters an information from a database 620. The information available in the database 620 includes at least a flight parameter 621 and corresponding position 622 of one or more arms 320 of the mechanism 220. Further, the data from the database 620 for the received flight parameters 621 are compared and a required position 640 of the arm 320 of the mechanism 220 is identified in process step 630. In step 650 the control joint 331 of the positioning system 330 is controlled to move the arm 320 of the mechanism 220 to attain the required position 640. The control in step 650 could be sending appropriate signals to the control joint 331 such that the control joint 331 will move the arm 320 accordingly. The signal could be one of or combination of an electric signal, or a hydraulic pressure, or a pneumatic pressure depending upon the system used in the control joint 330.

Figure 7:
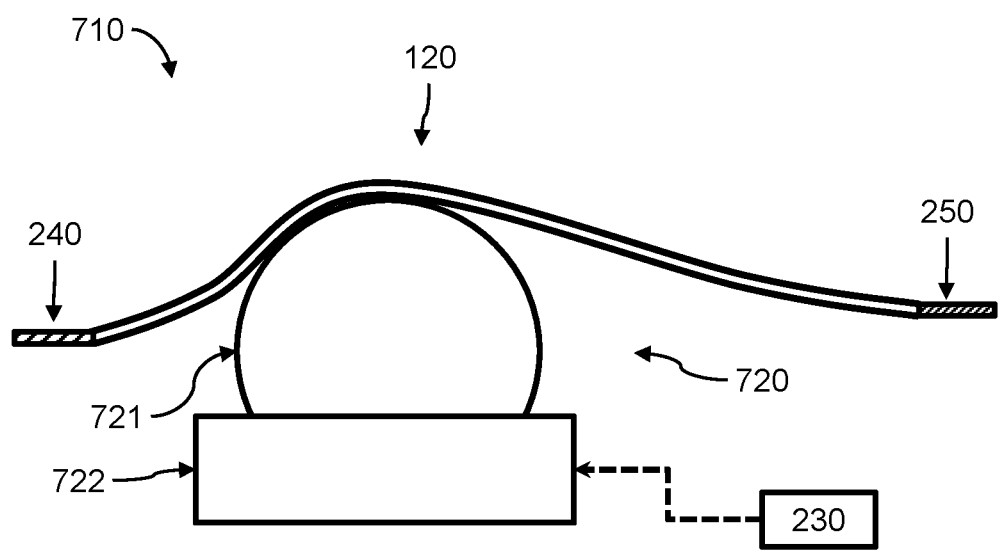
FIG. 7 shows schematically the mechanism of second embodiment.

FIG. 7 shows schematically an embodiment of an exemplary engine inlet 710 with a pressure based mechanism 720. In this illustration, the mechanism 720 includes a bladder 721 and a control joint 722 to control the shape of the flexible inlet 120. Upon receiving signal from the processing unit 230, the control joint 722 controls the pressure inside the bladder 721 to change the shape of the flexible inlet 120. The control joint 722 is further configured to move the bladder 721 in a plane substantially parallel to the planform of the flexible inlet 120. Alternatively, the device can be designed in such a way that part of the bladder 721 can be the flexible inlet 120.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. An engine inlet of an aircraft comprising;
   a flexible inlet, wherein the flexible inlet is formed of a deformable material;
      the flexible inlet comprising an outer surface, an inner surface, and plurality of edges;

the plurality of edges being attached at least partly to a fuselage skin of the aircraft and at least partly to an engine air intake duct of the aircraft;

at least one mechanism, the mechanism being configured to change at least a shape of the flexible inlet; and a processing unit, the processing unit being configured to control the mechanism;

wherein the mechanism comprises:

at least one head, the head being in contact with the inner surface of the flexible inlet;

at least one arm, the arm further comprising at least a first end and a second end, the first end of the arm being connected pivotally to the head of the mechanism;

at least one positioning system, the positioning system further including at least one control joint and a base;

the base of the positioning system being fixed to at least a structure of the aircraft;

the control joint of the positioning system being connected to the second end of the arm; and the control joint being configured to receive a signal from the processing unit, the signal from the processing unit being a required position of the arm.

2. The engine inlet of the aircraft of claim 1, wherein at least one of a flexibility and a strength of the deformable material of the flexible inlet is determined based on a shape of the flexible inlet.

3. The engine inlet of the aircraft of claim 2, wherein the deformable material of the flexible inlet comprises at least two sections comprising the same or different flexibility and strength.

4. The engine inlet of the aircraft of claim 1, wherein the flexible inlet is attached to the fuselage skin and engine air intake duct such that the outer surface of the flexible inlet is continuous with at least a surface of the fuselage skin of the aircraft and at least a surface of the engine air intake duct of the aircraft.

5. The engine inlet of the aircraft of claim 1, wherein the control joint of the positioning system is configured to control the arm of the mechanism by moving the arm along at least one of a longitudinal, lateral, and vertical axis of the arm.

6. The engine inlet of the aircraft of claim 1, wherein the control joint of the positioning system is configured to control the arm of the mechanism by rotating the arm along at least one of a longitudinal, lateral, and vertical axis of the arm.

7. The engine inlet of the aircraft of claim 1, wherein the shape of the flexible inlet is based on a fluid dynamic simulation result during a design of the aircraft.

8. The engine inlet of the aircraft of claim 7, wherein the fluid dynamic simulation includes at least one of numerical, computational, and experimental fluid dynamic simulation.

9. The engine inlet of the aircraft of claim 8, wherein the fluid dynamic simulation is performed for all flight conditions defined in a design mission profile and a design flight envelope of the aircraft.

* * * * *